No. 777,799.

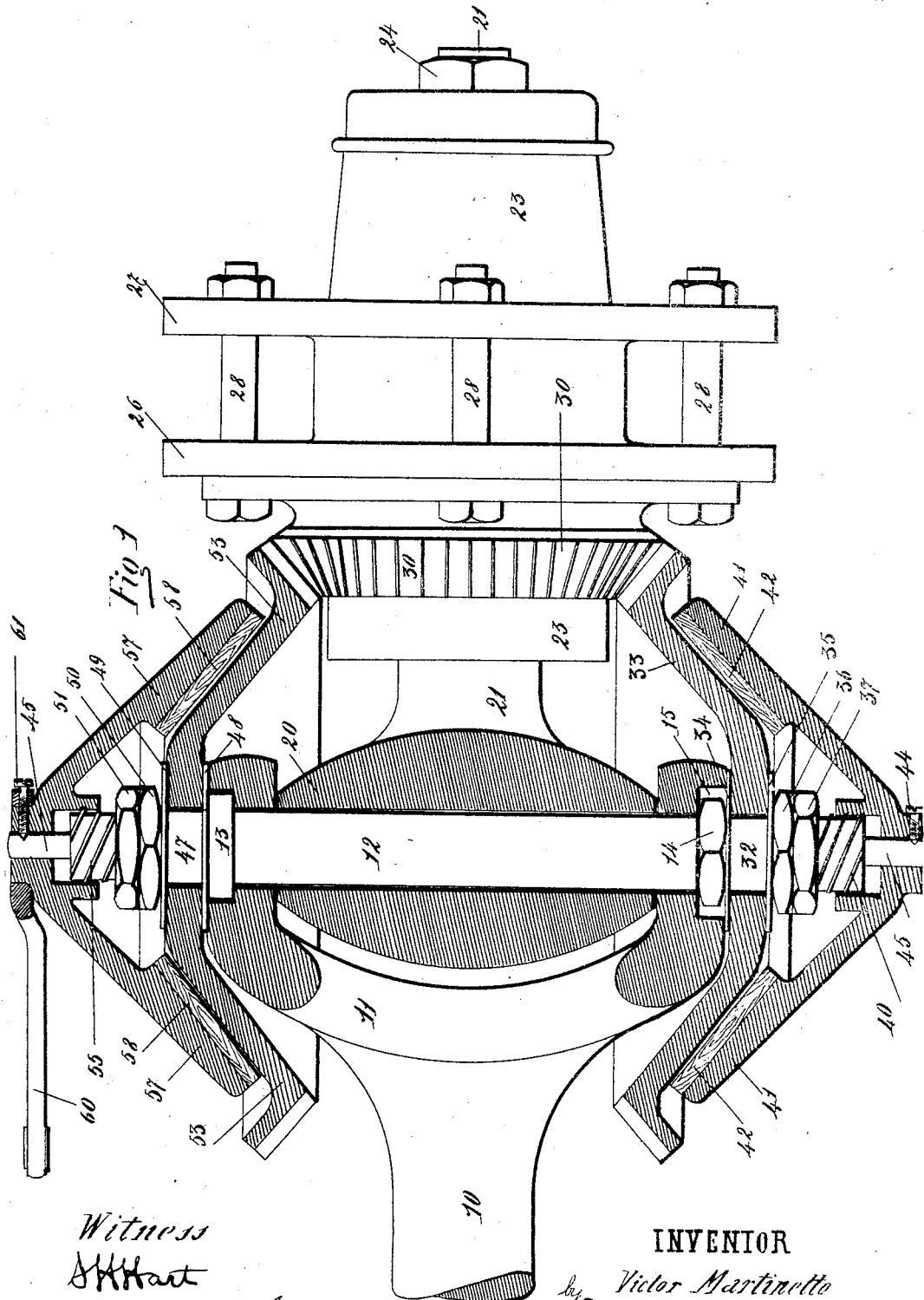

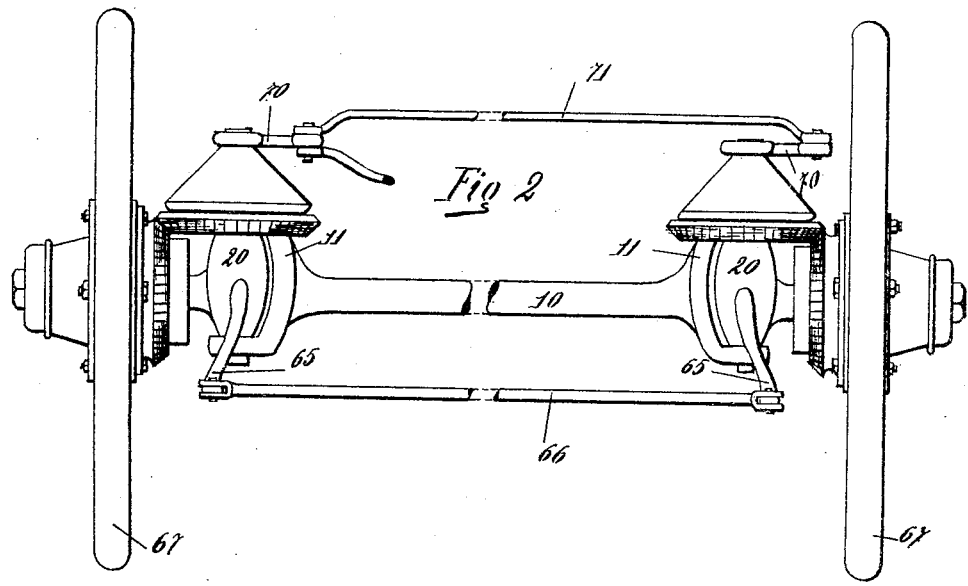
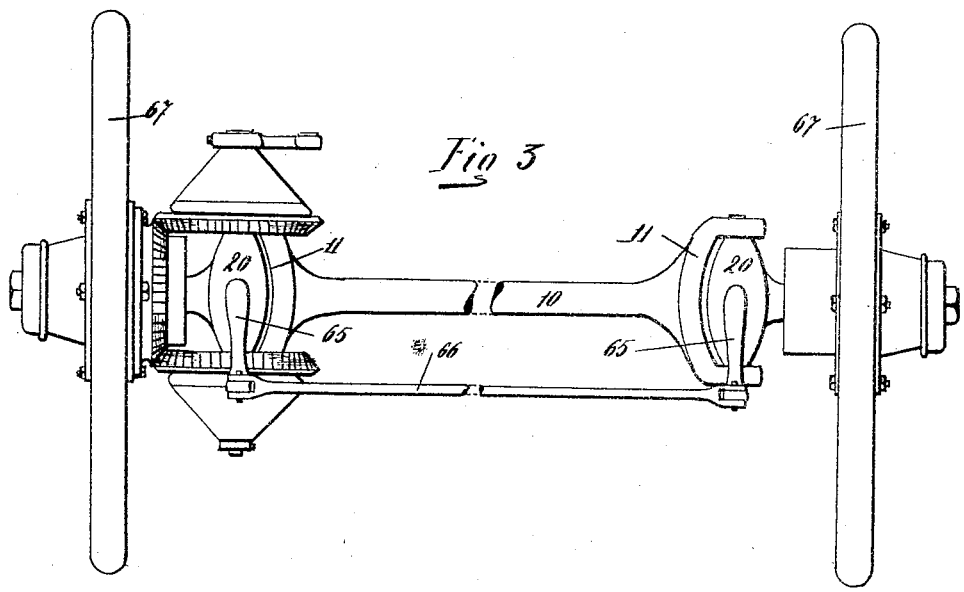

Patented December 20, 1904.

UNITED STATES PATENT OFFICE.

VICTOR MARTINETTO, OF CHICAGO, ILLINOIS, ASSIGNOR OF ONE-HALF TO HARRY L. BARTH, OF CHICAGO, ILLINOIS.

STEERING MECHANISM FOR VEHICLES.

SPECIFICATION forming part of Letters Patent No. 777,799, dated December 20, 1904.

Application filed March 7, 1904. Serial No. 196,961.

*To all whom it may concern:*

Be it known that I, VICTOR MARTINETTO, a citizen of Italy, residing at Chicago, in the county of Cook and State of Illinois, have invented a new and useful Steering Mechanism for Vehicles, of which the following is a specification in its best form now known to me, reference being had to the accompanying drawings, in which similar numerals indicate the same parts throughout the several views.

My invention relates to steering mechanism for vehicles, and is particularly applicable for use in automobiles.

The object of my invention is to provide such mechanism which can be easily and cheaply constructed, which shall be efficient in operation, and which will not readily be liable to get out of order, and particularly which shall be capable of steering the machine in any direction with a minimum amount of effort.

My invention consists, primarily, in the use of a clutch operating directly upon the hubs of the vehicle, which when operated in opposite directions will turn the wheels correspondingly.

My invention also consists in many details of construction, which will hereinafter be more fully described and claimed as the specification proceeds.

In the drawings, Figure 1 is a side elevation of the hub and axle of a vehicle, showing my mechanism attached thereto, the mechanism itself being shown in section. Fig. 2 is a side elevation of an axle with two wheels thereon, showing a modified form of my invention applied thereto. Fig. 3 is a similar view showing the form of my invention shown in Fig. 1 applied thereto.

Again, referring to the drawings, numeral 10 indicates the axle of an ordinary vehicle, having on opposite ends a yoke 11, on which is rigidly secured a vertical shaft or pin 12, having a head 13, adapted to fit into a recess in the top of the yoke 11, and having a nut 14 at its opposite end adapted to fit into a corresponding recess 15 in the lower arm of the yoke 11, said nut being adapted when tightened to secure the shaft 12 in rigid position. (See Fig. 1.) Journaled upon this vertical rod or shaft 12 is a vertical bearing 20, having extending from it (ordinarily, but not necessarily, in line with axle 10) a supplemental wheel-axle 21. Journaled upon this supplemental axle is a wheel-hub 23, secured in place by the usual nuts 24 or other suitable means. Upon this hub 23 are the usual plates 26 and 27, adapted to have the spokes of the wheel 67 secured between them by bolts 28 or other suitable means. Rigidly secured to the hub 23 and inside of the line of the spokes (toward the center of the vehicle) is a bevel-wheel, preferably a toothed gear 30, having its toothed face toward the vertical pin or shaft 12, heretofore described.

Journaled upon the lower end of the vertical pin 12 at 32 is a bevel wheel or gear 33, meshing with the bevel wheel or gear 30, heretofore described. This bevel wheel or gear 33 has on its opposite sides washer-plates 34 and 35, adapted to give the gear 33 free and easy rotation between the bottom of the yoke 11 and the nut 14, on the one hand, and the two check-nuts 36 and 37, on the other, placed upon the lower end of pin or shaft 12 below this bevel-gear 33. These two check-nuts 36 and 37 are so adjusted that in the absence of external locking mechanism the gear 33 is free to rotate upon the journal 32 of the pin or shaft 12. The portion of the pin 12 below these check-nuts 36 and 37 is threaded in the screw-threads 40, as shown in Fig. 1. Threaded upon these screw-threads just described is a clamping jaw or disk 41, preferably having a soft bearing-surface 42, such as soft wood, adapted when lightly forced upon the gear or bevel wheel 33, just described, to afford a sliding friction-surface and adapted when strongly forced upon the gear-wheel 33 to readily clamp the same. Rigidly secured to the clamping wheel or jaw 41, just described, by means of the screw 44 or other suitable means, is a vertical rod 45, adapted to freely slide up and down through the center of the pin or shaft 12, heretofore described. Similarly journaled at 47 between plates 48 and 49 on the one hand and check-nuts 50 and 51 on the other is a similar bevel-gear 53, meshing with gear 30, heretofore described. Similarly engaging screw-threads 55 upon the upper end of the pin 12 is another clamping disk or jaw 57, having similar soft faces of wood or other clamping material 58 adapted to engage the face of the gear 53. Rigidly secured to this clamping jaw or disk 57 is a hand-lever 60. The pin or screw 61, which secures the handle 60 to the clamping jaw or disk 57, also secures both the handle and the jaw to the vertical pin 45, heretofore described. The two jaws or disks 41 and 57, just described, are placed such a distance apart upon the pin or rod 45 that only one of said disks or jaws can be in contact with its bevel-wheel at the same time and that when the parts are in the middle position neither jaw 41 nor the jaw 57 will be clamped upon its gear. Both jaws being threaded upon the screw-threads upon the stationary pin or shaft 12 and the threads on opposite ends being of the same pitch it will readily be seen that rotating the handle 60 in one direction will clamp the jaw 57 upon its bevel-gear 53, while the other jaw 41 is released from its bevel-gear 33, and that rotating the handle 60 in the opposite direction will first release the jaw 57 from its bevel-gear 53 and that if this rotation is continued far enough will finally clamp the jaw or disk upon the opposite bevel-gear 33.

The vertical bearings 20 of the supplemental hubs 21 have extending from them arms 65, connected together by a connecting-rod 66, the parts being so located and proportioned that the rims of opposite steering-wheels 67 are parallel to each other in all positions.

In the operation of the preferred form of my device (shown in Figs. 1 and 3) the operator takes hold of the handle 60 and assuming that the wheels are in the position shown in Figs. 2 and 3, ready to go ahead, rotates the handle 60 until neither disk 41 nor disk 57 is in engagement with its bevel-gear. In this position both bevel-gears 53 and 33 rotate freely on their axes and exert no control whatever upon the bevel-gear 30, and consequently none upon the wheels 67. Except as effected by external influences, such as obstructions in the road, the steering-wheels 67 are now free to go straight ahead. When now the operator turns the handle 60 in one direction, so that, as heretofore described, he clamps the jaw 57 upon the bevel-gear 53, thereby locking it in position, the wheel 67 can only rotate by forcing the bevel-gear 30 to travel around the face of the bevel-gear 53, this being possible, as heretofore described, by the unlocking of the bevel-gear 33. When because of this bevel-gear 53' being locked the wheel 33 has traveled around the face of that gear sufficiently to move the adjacent wheels 67 to the proper position, the operator moves the handle 60 back until the wheel 53 is released and the wheels 67 are free to move straight ahead in its new direction. When the operator desires to guide the machine in the opposite direction, he simply rotates the handle 60 in the direction opposite to that in which he was previously moving it until he locks the jaw or disk 41 upon the bevel-gear 33, in which case the bevel-gear 30 will be forced to move over the face of the stationary wheel 33, thereby tending to rotate the adjacent steering-wheel 67 in the opposite direction from that in which the wheels 67 rotated when the wheel 53 was locked, thereby turning the wheels 67 so that the machine goes in the opposite direction. When the wheels have been rotated to the desired position, the operator releases the handle 60, and the wheels are free to move again in the new direction.

In practice the operator keeps hold of the lever 60 and by constantly moving it slightly in opposite directions keeps control on the steering-wheels 67 at all times, this taking place through the checking of the rotation of the wheel 53 or 33 rather than in a complete stopping of the same while in active operation, the upper face of the gear sliding upon the soft face, heretofore described, of the clamp, which is in contact with it. In practice the absolute locking of the clamping-jaw upon its bevel-gear, and consequently the absolute stopping of the bevel-wheel, is impractical, because it would cause the steering-wheels to turn too suddenly.

Fig. 2 shows a modified form of construction of my device in which the gear-wheel 33 and the clamping-disk 41 instead of being mounted upon the bottom of the rod or pin 45, on which the wheel 53 and the clamping-jaw 57 are mounted, are mounted upon the corresponding vertical rod or pin 12 of the opposite steering-wheel. The two levers 70 correspond to the lever 60 in Figs. 1 and 3 and are connected by connecting-rod 71. The mechanisms upon the opposite wheels of Fig. 2 are exactly like that of the upper half of Fig. 1, except that the screw-threads 55 upon the opposite rods 12 are cut in opposite directions, one right-handed and the other left-handed, so that moving the handle-rod 71 to one direction will clamp the friction wheel or jaw 57 upon one side of the machine and moving the handle-rod 71 in the opposite direction will release that jaw and clamp the jaw upon the opposite bevel-gear.

I do not wish to be understood as limiting myself to the exact details of construction, which may be varied within reasonable limits without departing from my invention.

Having thus described my invention, what I claim as new, and desire to secure by Letters Patent, is—

1. In mechanism of the class described, the combination of a vehicle-axle, a supplemental axle journaled in a vertical plane upon said axle, a steering-wheel journaled upon said supplemental axle, a bevel-disk mounted upon said steering-wheel, another bevel wheel or disk journaled in line with the pivotal point for the steering-wheel axle engaging the bevel-wheel upon the steering-wheel and mechanism under the control of the operator adapted to tend to clamp the second bevel-wheel in stationary position, whereby the first bevel-wheel is forced to travel around it, thereby moving the steering-wheel.

2. In mechanism of the class described, the combination of a vehicle-axle, a supplemental axle journaled in a vertical plane upon said main axle, a steering-wheel journaled upon said supplemental axle, a bevel-gear mounted upon said steering-wheel, another bevel-gear mounted in line with the pivotal point of the steering-wheel axle engaging the bevel-gear upon the steering-wheel and mechanism under the control of the operator adapted to tend to clamp the second bevel-gear in stationary position, whereby the first bevel-gear is forced to travel around it thereby turning the steering-wheel.

3. In mechanism of the class described, the combination of the vehicle-axle, a vertical pin or shaft rigidly secured thereto, a supplemental steering-wheel axle journaled upon said vertical pin or shaft, a steering-wheel journaled upon said supplemental axle, a bevel-disk mounted upon said steering-wheel, another bevel wheel or disk mounted upon said vertical shaft engaging the bevel-wheel upon the steering-wheel, and mechanism under the control of the operator adapted to clamp the second bevel-wheel in stationary position whereby the first bevel-wheel is forced to travel around it, thereby turning the direction of the steering-wheel.

4. In mechanism of the class described, the combination of a vehicle-axle, a vertical pin or shaft secured thereto, a supplemental axle journaled upon said vertical pin or shaft, a steering-wheel journaled upon said supplemental axle, a bevel-gear mounted upon said steering-wheel, another bevel-gear mounted upon said vertical shaft engaging the bevel-gear upon the steering-wheel, and mechanism under the control of the operator adapted to clamp the second bevel-gear in stationary position, whereby the first bevel-gear is forced to travel around it, thereby turning the direction of motion of the steering-wheel.

5. In mechanism of the class described, the combination of the axle of the vehicle, a vertical shaft thereon, a supplemental axle journaled upon said vertical shaft, a steering-wheel mounted upon said supplemental axle, a bevel-disk mounted upon said steering-wheel, another bevel-disk mounted upon said vertical shaft engaging the disk upon the steering-wheel, a clamp jaw or disk secured upon the end of said vertical shaft and a handle engaging said clamping jaw or disk adapted when rotated in one direction to move the clamping-jaw in contact with said bevel-disk and adapted when rotated in the opposite direction, to move said clamping jaw or disk away from said bevel-disk, whereby the steering-wheel is moved.

6. In mechanism of the class described, the combination of the vehicle-shaft, a yoke upon its end, a vertical shaft through said yoke, a supplemental axle journaled upon said shaft inside the yoke, a steering-wheel journaled upon said supplemental axle, a bevel-disk rigidly secured to the steering-wheel, two bevel-disks on opposite sides of said yoke each engaging the bevel-wheel upon the steering-wheel, a rod running through the vertical shaft and mechanism mounted upon opposite ends of said rod moving along said shaft, whereby as said rod is rotated in one direction one of said wheels is clamped in stationary position, while the other wheel is released and that moving said rod in the other direction the first-mentioned bevel-wheel is released and the other bevel-wheel is clamped in position, substantially as described.

7. In mechanism of the class described, the combination of a vehicle-axle, a yoke upon its end, a vertical shaft secured on said yoke, a supplemental axle pivotally mounted upon said vertical shaft, a steering-wheel journaled upon said supplemental axle, a bevel-disk upon said steering-wheel, horizontal bevel-disks mounted above and below said yoke upon said vertical shaft engaging the disk upon said steering-wheel, screw-threads upon the opposite ends of said vertical shaft, a rod slidable vertically through said vertical shaft, clamping jaws or disks rigidly secured to said vertical pin or rod and also threaded upon said screw-threads upon said vertical shaft and means for turning said jaws or disks upon said threads, the jaws or disks being so placed upon said rod and the parts so proportioned that rotating the rod in one direction clamps one disk upon the bevel-gear to which it is adjacent while the other bevel-gear is released; and that rotating the rod in the opposite direction releases that bevel-gear and clamps the opposite jaw upon the opposite bevel-gear.

8. In mechanism of the class described, the combination of a vehicle-axle, a supplemental axle journaled in substantially a vertical plane upon said axle, a steering-wheel journaled upon said supplemental axle, a transmission disk or wheel mounted upon said steering-wheel, another transmission wheel or disk journaled in line with the pivotal point for the steering-wheel axle engaging said first transmission-wheel upon the steering-wheel and mechanism under the control of the operator adapted to tend to clamp the second-mentioned transmission-wheel in stationary position, whereby, the first transmission-wheel is forced to travel around it, thereby moving the steering-wheel.

VICTOR MARTINETTO.

Witnesses:
BLANCHE L. WEST,
DWIGHT B. CHEEVER.